United States Patent
Solyom et al.

(10) Patent No.: US 9,358,963 B2
(45) Date of Patent: Jun. 7, 2016

(54) MOTOR VEHICLE SAFETY ARRANGEMENT AND METHOD

(71) Applicant: VOLVO CAR CORPORATION, Gothenburg (SE)

(72) Inventors: Stefan Solyom, Olofstorp (SE); Jonas Ekmark, Olofstorp (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/481,024

(22) Filed: Sep. 9, 2014

(65) Prior Publication Data

US 2015/0081187 A1 Mar. 19, 2015

(30) Foreign Application Priority Data

Sep. 19, 2013 (EP) .................................... 13185077

(51) Int. Cl.

| | |
|---|---|
| *B60K 31/00* | (2006.01) |
| *B60T 7/22* | (2006.01) |
| *B60T 8/17* | (2006.01) |
| *B60W 30/09* | (2012.01) |
| *B60W 30/16* | (2012.01) |
| *G01S 17/93* | (2006.01) |
| *B62D 15/02* | (2006.01) |
| *G01S 13/93* | (2006.01) |
| *G01S 13/86* | (2006.01) |

(52) U.S. Cl.
CPC . *B60T 7/22* (2013.01); *B60K 31/00* (2013.01); *B60T 8/17* (2013.01); *B60W 30/09* (2013.01); *B60W 30/16* (2013.01); *B62D 15/0265* (2013.01); *G01S 13/931* (2013.01); *G01S 17/936* (2013.01); *B06B 2201/76* (2013.01); *G01S 13/867* (2013.01); *G01S 2013/9346* (2013.01); *G01S 2013/9375* (2013.01)

(58) Field of Classification Search
None
See application file for complete search history.

(56) References Cited

U.S. PATENT DOCUMENTS

| 6,347,266 B1 | 2/2002 | Kageyama | |
|---|---|---|---|
| 2006/0163943 A1* | 7/2006 | Von Holt et al. | 303/177 |

(Continued)

FOREIGN PATENT DOCUMENTS

| EP | 1717778 | 11/2006 |
|---|---|---|
| EP | 2407357 | 1/2012 |
| WO | 2006097467 | 9/2006 |

OTHER PUBLICATIONS

Extended European Search Report for EP 13185077.8 Completed by the European Patent Office, Dated Jan. 27, 2014, 7 Pages.

*Primary Examiner* — Thomas Tarcza
*Assistant Examiner* — Garrett Evans
(74) *Attorney, Agent, or Firm* — Brooks Kushman P.C.

(57) ABSTRACT

A safety arrangement and method are described for controlling automatic travel of a fully automated vehicle. One or more forward-looking detection systems are provided for detecting objects in a future path of the vehicle. A control unit is configured to determine a detection confidence for the detected objects. The control unit is further operable to, upon low confidence for existence of a detected object, control a brake system of the vehicle to apply a predetermined limited amount of braking until high confidence is obtained for existence or non-existence of the previously detected object. Thereafter the control unit is further operable to apply full braking if high confidence is obtained for existence of the previously detected object and to discontinue braking if high confidence is obtained for non-existence of the previously detected object.

11 Claims, 3 Drawing Sheets

(56) References Cited

U.S. PATENT DOCUMENTS

| | | |
|---|---|---|
| 2010/0094520 A1 | 4/2010 | Zagorski |
| 2013/0030651 A1 | 1/2013 | Moshchuk et al. |
| 2013/0158852 A1* | 6/2013 | Stahlin et al. ................. 701/301 |
| 2014/0046567 A1* | 2/2014 | Schuler ........................... 701/70 |

\* cited by examiner

MOTOR VEHICLE SAFETY ARRANGEMENT AND METHOD

CROSS-REFERENCE TO RELATED APPLICATIONS

This application claims foreign priority benefits under 35 U.S.C. §119(a)-(d) to European patent application number EP 13185077.8, filed Sep. 19, 2013, which is incorporated herein by reference in its entirety.

TECHNICAL FIELD

Embodiments herein relate to a safety arrangement for controlling automatic travel of a fully automated vehicle.

Further embodiments herein relate to a method for controlling safe automatic travel of a fully automated vehicle.

Still further embodiments herein relate to a motor vehicle comprising a safety arrangement for controlling automatic travel of a fully automated vehicle.

BACKGROUND

In fully automated motor vehicles the driver is no longer engaged in the task of driving. This increases the requirements on vehicle systems, in particular the vehicle sensory systems. Most vehicles sensory systems relied on today have capabilities which decrease with increased sensing distances. This presents a challenge as the sensors of the sensory systems are required to detect any objects present in the future path of the vehicle, while at the same time minimizing the number of false or erroneous detections.

Today's sensor systems have good object classification capabilities at short and medium ranges, e.g. below 50 m. This is especially achieved by having fused information between different sensors, e.g. radar sensors and camera based sensors.

However, at longer ranges the capability to discern threatening objects from irrelevant or erroneous object reflections, e.g. sensing ghosts, decreases dramatically.

One attempt to ensure that an automatic traveling vehicle with an object detector can travel at high speed without colliding or interfering with a detected object is described by U.S. Pat. No. 6,347,266.

The vehicle described by U.S. Pat. No. 6,347,266 is controlled in accordance with a method to travel along a predetermined course, information representative of which is provided. Objects in a path of the vehicle are detected by transmitting a medium in a direction and evaluating the medium reflected from any objects in the direction.

An object detector receives reception and transmission information, i.e. in other words, a frequency, a reception and transmission strength, and the like, regarding the directional medium produced and received. An object detector further analyzes an object detection status, i.e. whether or not any object is detected, a distance to an object, a relative speed to an object and the like.

The direction to transmit the medium is determined based on at least the information representative of the predetermined course. A current vehicle speed is adjusted based on detected objects. A critical detection area, representative of an actual area defined by the medium radiated through a predetermined angular range, is determined.

The step of determining the direction to transmit the medium is further based on the critical detection area. The step of adjusting current vehicle speed includes determining a current position of the vehicle relative to the predetermined course, and providing a plurality of predetermined speed settings, where each predetermined speed setting corresponds to a braking distance. A current speed of the vehicle is determined as well as a farthest distance from the current position of the vehicle in an area defined by overlapping the critical detection area with the predefined course.

Thus, the current vehicle speed is adjusted to a speed not to exceed a predefined speed setting having a corresponding braking distance equal to the farthest distance. According to the above configuration, the automatic traveling vehicle is capable of evaluating the greatest effective detection area. Thus, the automatic traveling vehicle can travel at high speed without colliding or interfering with a detected object.

However, the vehicle described by U.S. Pat. No. 6,347,266 will thus always adapt it speed such that it is able to perform braking action if an object is detected within the greatest effective detection area.

Known systems of the above described type will, in order to minimize false detection, usually perform speed adaptation first once the object detector is convinced that an object is detected. This may lead to an automated speed reduction or braking being performed quite late and therefore possibly also quite hard. As a consequence thereof, in order to ensure good long range performance, more sophisticated and therefore usually also more expensive sensors may be relied on, which increases system cost and complexity.

SUMMARY

Embodiments herein aim to provide an improved safety arrangement for controlling automatic travel of a fully automated vehicle.

This is provided through the safety arrangement comprising: one or more forward-looking detection systems for detecting objects in a future path of the vehicle; a control unit arranged to determine a detection confidence for the detected objects; where the control unit further is operable to, upon low confidence for existence of a detected object, control a brake system of the vehicle to apply a predetermined limited amount of braking until high confidence is obtained for existence or non-existence of the previously detected object, whereupon the control unit further is operable to apply full braking if high confidence is obtained for existence of the previously detected object and to discontinue braking if high confidence is obtained for non-existence of the previously detected object.

The provision to apply a predetermined limited amount of braking until high confidence is obtained for existence or non-existence of the previously detected object is ensured that all obstacles are accounted for and facilitates cost efficient realization of the arrangement as sensors which are normally already present in today's vehicles can be used.

According to a second aspect the control unit is operable to apply the predetermined limited amount of braking in accordance with a predetermined braking profile by which collision with a detected object is avoided while braking is minimized at all instances.

The provision of a predetermined braking profile by which collision with a detected object is avoided while braking is minimized at all instances provides for a comfortable ride for vehicle occupants.

According to a third aspect in accordance with the predetermined braking profile object detection confidence is weighted with respect to the distance to a detected object.

The provision of detection confidence that is weighted with respect to the distance to a detected object also facilitates cost efficient realization of the arrangement as determination can be made using sensors that are normally already present in today's vehicles.

According to a fourth aspect the control unit is operable to apply the predetermined limited amount of braking in accordance with the predetermined braking profile by balancing vehicle occupant comfort with detection confidence for the detected object.

The provision of balancing vehicle occupant comfort with detection confidence also facilitates cost efficient realization of the arrangement while at the same time providing for a comfortable ride for vehicle occupants.

According to a fifth aspect the predetermined braking profile has been obtain through setting up an optimal control problem.

Setting up an optimal control problem in this way is a good way to ensure maintained comfort for vehicle occupants whilst avoiding detected obstacles in a simple and cost efficient manner using sensors that are normally already present in today's vehicles.

According to a sixth aspect the predetermined braking profile has been obtain through setting up the optimal control problem as:

$$J = \min_u \left\{ \phi(x(T)) + \int_0^T L(x, u) dt \right\}$$

subject to: $\dot{x}=f(x,u)$ and where $0 \leq u \leq u_{max}$ and $u_{max}$ is maximum braking and f describes a double integrator and L is the weighted sum of squares of system states and the control system where the weights are the tuning parameters.

Obtaining the predetermined braking profile in this way is simple and cost efficient as a numerical method can be used in order to calculate the predetermined braking profile such that safety can be maintained with maintained comfort for vehicle occupants while enabling use of reasonably priced sensors.

According to a seventh aspect the forward-looking detection systems comprises one or more of a radar sensor, a laser sensor, a lidar sensor, an ultrasound sensor, an infrared sensor, an image sensor, or any combination thereof.

The provision of detection systems of this kind provides for reliable detection of objects.

According to an eight aspect the control unit is arranged to determine the detection confidence for the detected objects based on fused information from two or more sensors.

Determining the detection confidence based on fused information from two or more sensors provides for a simple and reliable high quality determination of the detection confidence for a detected object.

According to a ninth aspect is further provided a method for controlling safe automatic travel of a fully automated vehicle comprising the steps of: detecting objects in a future path of the vehicle using one or more forward-looking detection systems; determining a detection confidence for the detected objects using a control unit; upon determining a low confidence for existence of a detected object, control a brake system of the vehicle to apply a predetermined limited amount of braking until high confidence is obtained for existence or non-existence of the previously detected object, if high confidence is obtained for existence of the previously detected object apply full braking using the control unit and if high confidence is obtained for non-existence of the previously detected object to discontinue braking.

The provision of a method for controlling safe automatic travel of a fully automated vehicle as above provides for ensuring that all obstacles are accounted for and that the vehicle will be able to brake to a full stop should the detected object be real, and also facilitates cost efficient realization as sensors which are normally already present in today's vehicles can be used.

According to a tenth aspect a motor vehicle is provided which comprises a safety arrangement for controlling automatic travel of a fully automated vehicle as described herein.

A motor vehicle comprising a safety arrangement for controlling automatic travel of a fully automated vehicle as described herein will provide improved safety and ride comfort for vehicle occupants during automatic travel through ensuring obtaining of high confidence object detection while maintaining a smooth and comfortable ride experience.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Embodiments herein will now be described more fully with reference to the accompanying drawings, in which example embodiments are shown. However, this application should not be construed as limited to the embodiments set forth herein. Disclosed features of example embodiments may be combined as readily understood by one of ordinary skill in the art to which this application belongs. Unless explicitly described to the contrary, the word "comprise" and variations such as "comprises" or "comprising" will be understood to imply the inclusion of stated elements but not the exclusion of any other elements.

Figure 1:
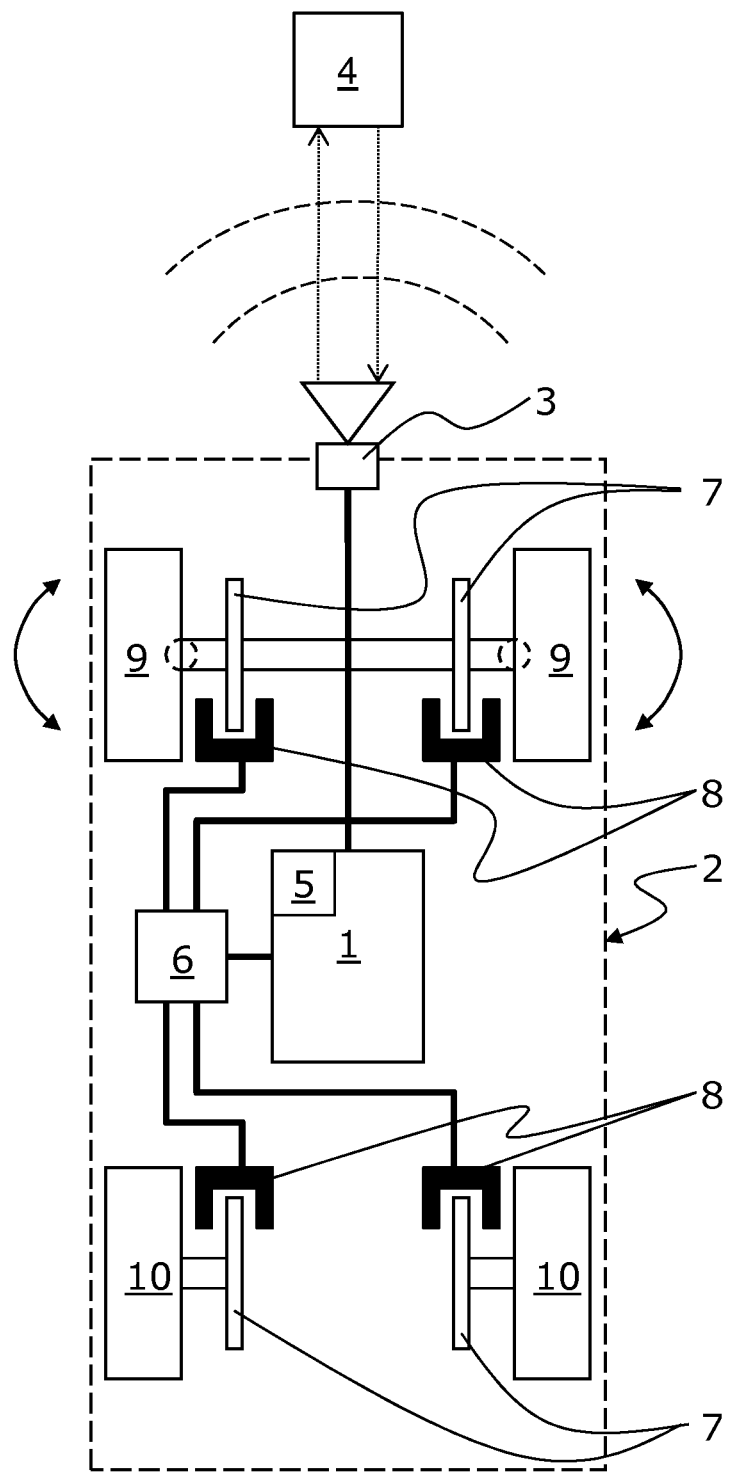
FIG. 1 is a schematic illustration of a safety arrangement for controlling automatic travel of a fully automated vehicle according to embodiments hereof.

In overview, embodiments herein relate to a safety arrangement 1 for controlling automatic travel of a fully automated vehicle 2, as schematically illustrated in FIG. 1.

The safety arrangement 1 for controlling automatic travel of a fully automated vehicle 2 comprises one or more forward-looking detection systems 3 for detecting and ranging objects 4 in a future path of the vehicle 2.

In some embodiments hereof the forward-looking detection systems 3 comprises one or more of a Radio Detection And Ranging (RADAR) sensor, a Light Amplification by Stimulated Emission of Radiation (LASER) sensor, a Light Detection And Ranging (LIDAR) sensor, an ultrasound sensor, an infrared sensor, an image sensor, or any combination thereof.

The image sensor may be a video sensor, designed as either a Charge-Coupled Device (CCD) camera or a Complementary Metal-Oxide Semiconductor (CMOS) camera, for example.

The safety arrangement 1 further comprises a control unit 5 arranged to determine a detection confidence for the detected objects 4. The control unit 5 suitably comprises a processing unit, such as a computer processor, which may include memory, and appropriate software, i.e., stored computer executable instructions, for controlling operation thereof and/or performing or controlling the operations described herein.

In some embodiments hereof the control unit 5 is arranged to determine the detection confidence for the detected objects 4 based on fused information from two or more sensors, which provides for a simple and reliable high quality determination of the detection confidence for a detected object 4.

The control unit 5 further is operable to, upon low confidence for existence of a detected object 4, control a brake system 6 of the vehicle 2 to apply a predetermined limited amount of braking until high confidence is obtained for existence or non-existence of the previously detected object 4.

The brake system 6 of the vehicle 2 may be an ABS system, e.g. with brake discs 7 and appertaining calipers 8 associated with each of the front wheels 9 and rear wheels 10. The safety arrangement 1 is thus operatively connected with the braking system 6 of the vehicle 2.

When high confidence for existence or non-existence of the previously detected object 4 is obtained as above the control unit 5 further is operable to apply full braking if high confidence is obtained for existence of the previously detected object 4. Hereby is facilitated the acquisition of better confidence regarding the detected objects 4 by decreasing the gap thereto in a controlled manner, and only applying full braking once high confidence is obtained for existence of the previously detected object 4.

Thus, upon low-confidence detection of an object 4 at a greater distance automatic braking of the vehicle 2 is executed to enable the sensor system to acquire improved confidence measurements of the object 4 by decreasing the gap thereto, hereby maximizing the ability of the sensing system to gain accurate readings on an object 4 in the environment.

Also, when high confidence for existence or non-existence of the previously detected object 4 is obtained as above the control unit 5 further is operable to discontinue braking if high confidence is obtained for non-existence of the previously detected object 4. Hereby, in case the previously detected object 4 was an erroneously detected object 4, i.e. no collision threat exists, braking can be discontinued and the automatic travel of the fully automated vehicle 2 maintained, without causing discomfort or alarm to occupants of the vehicle 2.

Consequently, braking is commenced much earlier than in conventional collision avoidance systems and at levels that are not disturbing to the driver, with the aim of allowing the sensor system to acquire an improved understanding of the objects 4 detected. In case this improved understanding indicates that the initial detection was erroneous braking is discontinued.

According to embodiments hereof the control unit 5 is operable to apply the predetermined limited amount of braking in accordance with a predetermined braking profile by which collision with a detected object 4 is avoided while braking is minimized at all instances providing for a comfortable ride for vehicle 2 occupants, while taking into account the dynamics, abilities and braking capabilities of the vehicle 2. The predetermined braking profile should have very soft transitions in order to provide good ride comfort to vehicle 2 occupants.

In accordance with the predetermined braking profile object 4 detection confidence is weighted with respect to the distance to a detected object 4, e.g. such that detection confidence becomes higher with decreased distance to the possible object 4 and vice versa. In this way is mimicked the behavior of a human driver, who's certainty of an observed object normally will increase once he/she gets closer to the object. The uncertainty of the sensed information is weighted with respect to the distance to the possible object 4 in order to improve confidence in object 4 detection.

According to embodiments hereof the control unit 5 is operable to apply the predetermined limited amount of braking in accordance with the predetermined braking profile by balancing vehicle 2 occupant comfort with detection confidence for the detected object 4. Hereby cost efficient realization of the arrangement is facilitated while at the same time is provided for a comfortable ride for vehicle 2 occupants.

In some embodiments hereof the predetermined braking profile has been obtain through setting up an optimal control problem. In particular, the predetermined braking profile has been obtained through setting up the optimal control problem as:

$$J = \min_u \left\{ \phi(x(T)) + \int_0^T L(x, u) dt \right\}$$

subject to: $\dot{x}=f(x,u)$ and where $0 \leq u \leq u_{max}$ and $u_{max}$ is maximum braking and f describes a double integrator and L is the weighted sum of squares of system states and the control system where the weights are the tuning parameters.

This provides a numerical method that can be used in order to calculate the predetermined braking profile such that safety can be maintained with maintained comfort for vehicle 2 occupants while enabling use of reasonably priced sensors.

According to the present application is also envisaged a method for controlling safe automatic travel of a fully automated vehicle 2. The method comprises the steps of: detecting objects 4 in a future path of the vehicle 2 using one or more forward-looking detection systems 3; determining a detection confidence for the detected objects 4 using a control unit 5; upon determining a low confidence for existence of a detected object 4, control a brake system 6 of the vehicle 2 to apply a predetermined limited amount of braking until high confidence is obtained for existence or non-existence of the previously detected object 4, if high confidence is obtained for existence of the previously detected object 4 apply full braking using the control unit 5 and if high confidence is obtained for non-existence of the previously detected object 4 to discontinue braking.

Figure 2:
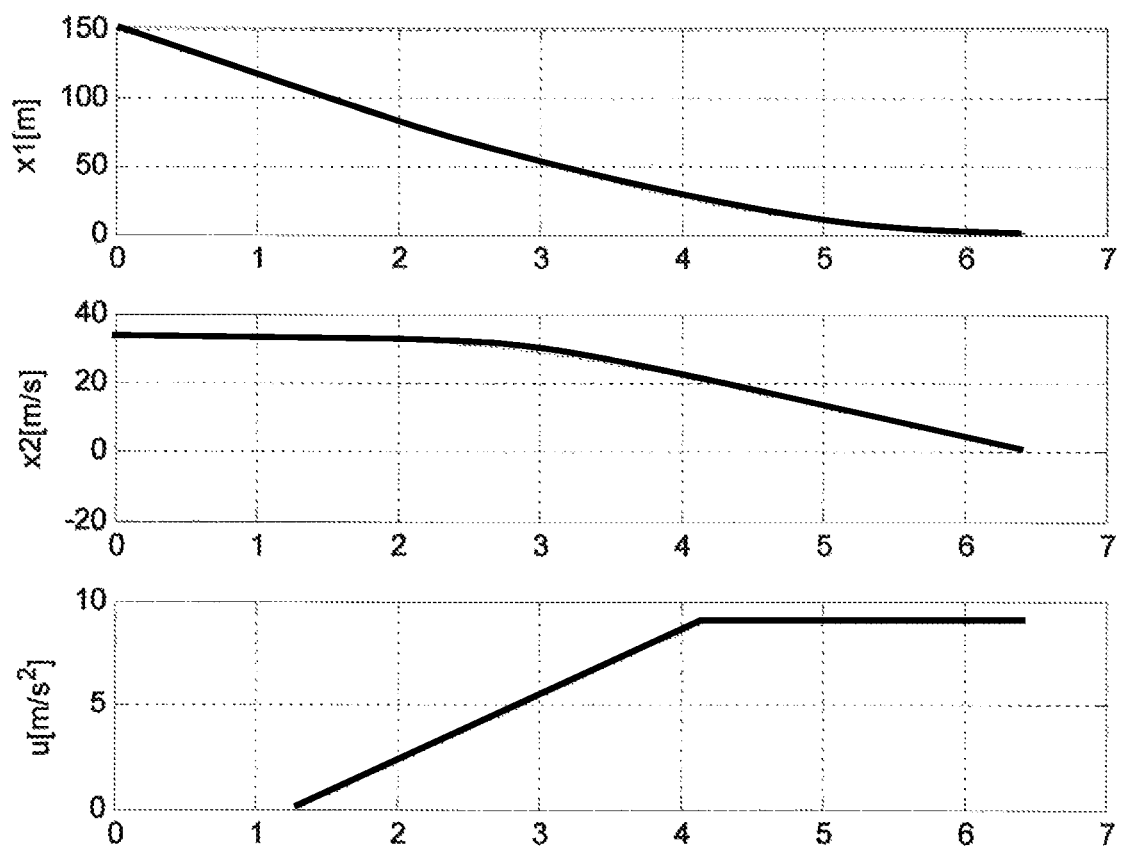
FIG. 2 is a schematic illustration of braking pattern during uncertain sensor information according to embodiments hereof.

A schematic illustration of braking pattern during uncertain sensor information is illustrated in FIG. 2. A possible obstacle is detected at a distance of 150 m (×1). The predetermined braking profile obtained through setting up the optimal control problem, as described above, starts acting after approximately 1.5 seconds. Hereafter the possible collision object 4 is at a distance below 100 m where the sensing system has an improved ability to assess whether the object 4 is detected with high confidence or not, i.e. if there is an object 4 or not. At this point the arrangement starts to increase the braking (u). Near full braking is achieved after about 4 seconds, which corresponds to approximately 25 m. A typical sensor system will have the ability to detect an object 4 with high confidence at considerably longer distances than 25 m.

Figure 3:
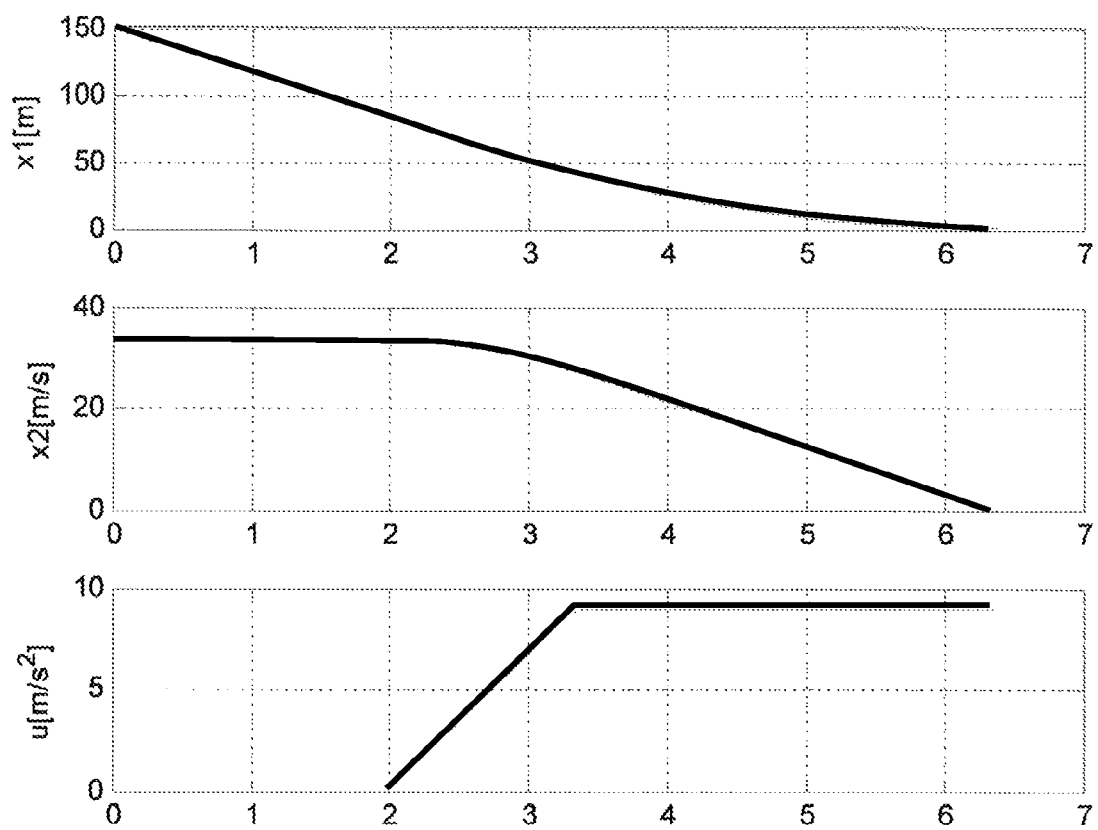
FIG. 3 is a schematic illustration of braking pattern for the same scenario as in FIG. 2, where the braking point has been delayed in dependence of tuning parameters.

FIG. 3 schematically illustrates the braking pattern for the same scenario as in FIG. 2, where the braking point has been delayed by in dependence of tuning parameters.

It should be noted that the proposed braking profile obtained through setting up the optimal control problem, as described above, is not a collision avoidance algorithm in the classical sense. In the latter one wants to delay the braking until the final moment, allowing a driver to perform an override action. This will normally result in very harsh braking. As proposed herein, braking is commenced much earlier and at levels that are not disturbing a vehicle 2 occupant, such as a driver, with the aim of getting a better understanding of the obstacles ahead. Also, if there is an erroneous detection the braking is simply discontinued.

According to the present application is also envisaged a motor vehicle 2 that comprises a safety arrangement 1 for controlling automatic travel of a fully automated vehicle 2 as described herein.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

What is claimed is:

1. A safety arrangement for controlling automatic travel of a fully automated vehicle, the arrangement comprising:
   one or more forward-looking detection systems for detecting objects in a future path of the vehicle; and
   a control unit configured to determine a detection confidence for detected objects;
   wherein the control unit is operable to, upon low confidence for existence of a detected object, control a brake system of the vehicle to apply a predetermined limited amount of braking until high confidence is obtained for existence or non-existence of the previously detected object, to control the brake system to apply full braking if high confidence is obtained for existence of the previously detected object, and to control the brake system to discontinue braking if high confidence is obtained for non-existence of the previously detected object.

2. The safety arrangement according to claim 1 wherein the control unit is operable to apply the predetermined limited amount of braking in accordance with a predetermined braking profile by which collision with a detected object is avoided while braking is minimized at all instances.

3. The safety arrangement according to claim 2 wherein, in accordance with the predetermined braking profile, object detection confidence is weighted with respect to a distance to a detected object.

4. The safety arrangement according to claim 2 wherein the control unit is operable to apply the predetermined limited amount of braking in accordance with the predetermined braking profile by balancing vehicle occupant comfort with detection confidence for a detected object.

5. The safety arrangement according to claim 2 wherein the predetermined braking profile has been obtain through setting up an optimal control problem.

6. The safety arrangement according to claim 5 wherein the predetermined braking profile has been obtained through setting up the optimal control problem as:

$$J = \min_u \left\{ \phi(x(T)) + \int_0^T L(x, u) dt \right\}$$

subject to: $\dot{x}(f(x,u)$ and where $0 \leq u \leq u_{max}$ and $u_{max}$ is maximum braking and f describes a double integrator and L is the weighted sum of squares of system states and the control system where the weights are the tuning parameters.

7. The safety arrangement according to claim 1 wherein the forward-looking detection systems comprises one or more of a radar sensor, a laser sensor, a lidar sensor, an ultrasound sensor, an infrared sensor, an image sensor, or any combination thereof.

8. The safety arrangement according to claim 7 wherein the control unit is configured to determine the detection confidence for detected objects based on fused information from two or more sensors.

9. A method for controlling safe automatic travel of a fully automated vehicle, the method comprising:
   detecting objects in a future path of the vehicle using one or more forward-looking detection systems;
   determining a detection confidence for detected objects using a control unit;
   upon determining a low confidence for existence of a detected object, controlling a brake system of the vehicle to apply a predetermined limited amount of braking until high confidence is obtained for existence or non-existence of the previously detected object; and
   if high confidence is obtained for existence of the previously detected object, controlling the brake system of the vehicle to apply full braking using the control unit, and if high confidence is obtained for non-existence of the previously detected object, controlling the brake system to discontinue braking.

10. A motor vehicle comprising a safety arrangement for controlling automatic travel of a fully automated vehicle according to claim 1.

11. A safety arrangement for controlling automatic travel of a fully automated vehicle, the arrangement comprising:
   a forward-looking detection systems for detecting objects in a future path of the vehicle; and
   a control unit configured to determine a detection confidence for detected objects and, upon low confidence for existence of a detected object, control a brake system of the vehicle to apply a first amount of braking until high confidence is obtained for existence or non-existence of the previously detected object, to control the brake system to apply a second amount of braking greater than the first amount if high confidence is obtained for existence of the previously detected object, and to control the brake system to discontinue braking if high confidence is obtained for non-existence of the previously detected object.

* * * * *